United States Patent
Chan et al.

(10) Patent No.: US 10,191,810 B2
(45) Date of Patent: Jan. 29, 2019

(54) MOBILE TERMINAL AND RELATED REPAIR METHOD

(71) Applicant: MediaTek Singapore Pte. Ltd., Singapore (SG)

(72) Inventors: Ching-Ho Chan, Taoyuan (TW); Hao-Hsiang Hsu, Taipei (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 157 days.

(21) Appl. No.: 15/174,663

(22) Filed: Jun. 6, 2016

(65) Prior Publication Data
US 2017/0177450 A1    Jun. 22, 2017

(30) Foreign Application Priority Data
Dec. 17, 2015 (CN) .......................... 2015 1 0963003

(51) Int. Cl.
*G06F 11/00* (2006.01)
*G06F 11/14* (2006.01)

(52) U.S. Cl.
CPC ...... *G06F 11/1415* (2013.01); *G06F 11/1417* (2013.01); *G06F 11/1433* (2013.01); *G06F 2201/82* (2013.01); *G06F 2201/83* (2013.01)

(58) Field of Classification Search
CPC .. G06F 11/07; G06F 11/0742; G06F 11/0751; G06F 11/0793; G06F 11/1415; G06F 11/1417; G06F 11/1433; G06F 11/1469; G06F 21/50–21/57; H04W 12/06; H04W 12/08
See application file for complete search history.

(56) References Cited

U.S. PATENT DOCUMENTS

| | | | |
|---|---|---|---|
| 8,782,435 B1* | 7/2014 | Ghose | G06F 9/3851 711/118 |
| 2008/0168275 A1* | 7/2008 | De Atley | G06F 21/51 713/189 |
| 2014/0075567 A1* | 3/2014 | Raleigh | H04W 12/10 726/26 |
| 2017/0068585 A1* | 3/2017 | Wang | G06F 11/07 |

* cited by examiner

*Primary Examiner* — Michael Maskulinski
(74) *Attorney, Agent, or Firm* — McClure, Qualey & Rodack, LLP

(57) ABSTRACT

A mobile terminal and related repair method is disclosed. The method includes: obtaining current storage integrity information of the mobile terminal; matching the current storage integrity information and original storage integrity information, when the matching fails, connecting to the server, obtaining original system partition document from the server, and repairing the system partition according to the original system partition document.

4 Claims, 4 Drawing Sheets

MOBILE TERMINAL AND RELATED REPAIR METHOD

CROSS REFERENCE TO RELATED APPLICATIONS

This Application claims priority of China Patent Application No. 200510963003.X, filed on Dec. 17, 2015, the entirety of which is incorporated by reference herein.

BACKGROUND OF THE INVENTION

Field of the Invention

The present invention relates to an electronic communication technology field, and more particularly to a mobile terminal and related repair method.

Description of the Related Art

As to portable electronic products (such as mobile phones and other mobile terminals), it is hard to distinguish whether the malfunction of the portable electronic product is caused by the quality of the portable electronic product itself, or the original system of the portable electronic product has been modified, which causes the maintenance cannot be quickly and correctly completed.

The operation system carried by the mobile terminal is considered as the original system, i.e. the official system, and the original system is not allowed to be modified to maintain the stability of the operation of the mobile terminal.

Moreover, the original system is the official system of mobile terminal manufacturers, and the modification of the official system will undergo certain risks. The official system adopts optimized technology to improve the performance of the phone in order to achieve a good software and hardware compatible. Thus, the system can operate more stable and safer. When modifying the official system by cracking the system, the software usually need to be changed, and it is easy to cause the incompatible issue between the software and the hardware, and the mobile terminal may not be operated normally or cannot be rebooted. Therefore, once the official system of mobile terminal is modified, and the mobile terminal breaks down, the only way to solve the problem is sending the mobile terminal back to the service center or returning the mobile terminal to the manufacturer for repair. It wastes the user's time and money and increases the maintenance cost of the mobile terminal.

BRIEF SUMMARY OF THE INVENTION

In a preferred embodiment, the disclosure provides a repair method for a mobile terminal. The repair method comprises steps of obtaining a current storage integrity information of a system partition of the mobile terminal; matching the current storage integrity information and an original storage integrity information; and when the matching fails, connecting to a server, obtaining an original system partition document from the server, and repairing the system partition according to the original system partition document.

In another preferred embodiment, the disclosure provides a mobile terminal. The mobile terminal comprises an acquisition module, a matching module and a repairing module. The acquisition module obtains current storage integrity information of the mobile terminal. The matching module matches the current storage integrity information and original storage integrity information. The repairing module connects to a server to obtain an original system partition document from the server, and repairs the system partition according to the original system partition document when matching fails.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
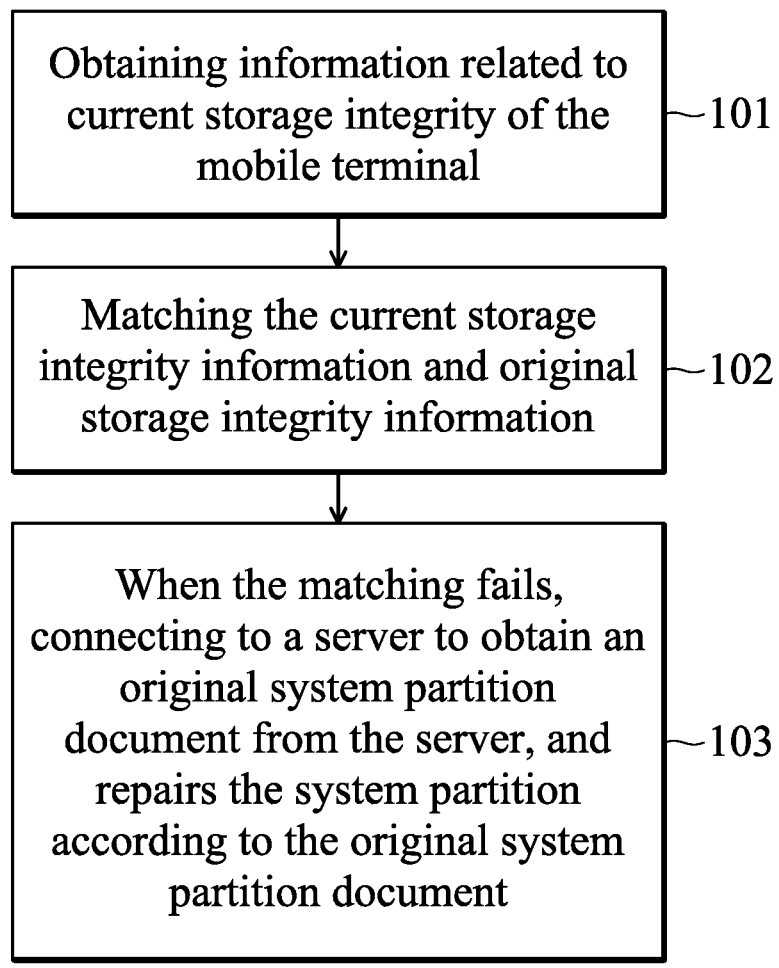
FIG. 1 is a flowchart of a repair method for a mobile terminal according to an embodiment of the invention.

Please refer to FIG. 1. FIG. 1 is a flowchart of a repair method for a mobile terminal according to an embodiment of the invention. The method comprises the following steps.

Step 101: obtaining information related to current storage integrity of a system partition of the mobile terminal. The information related to current storage integrity indicates whether the documents stored in the mobile terminal are complete documents. When a current system of the mobile terminal is an original system, the current documents stored in the mobile terminal are complete documents. When the current system of the mobile terminal is not the original system, the current documents stored in the mobile terminal are incomplete documents.

The original system, also called official system, is the system carried by the mobile terminal before shipping or the upgraded system after shipping. The information related to the current storage integrity is the information related to storage integrity of the current system. Specifically, the information related to the storage integrity may be the system document information of the system partition, or document information of other partition, or system version information, system creation time, such as a storage path, a name or content of a system document.

Step 102: matching the current storage integrity information and original storage integrity information.

The original storage integrity information is information related to storage integrity of the original system. By matching the current storage integrity information and the original storage integrity information, the information related to current storage integrity is the same as information related to original storage integrity when matching, and it means that the documents stored in the mobile terminal are complete documents, the system carried on the mobile terminal is the original system, and a message indicating that the current system is the complete system is output. When the matching fails, the information related to current storage integrity is different from information related to original storage integrity, the system carried on the mobile terminal is not the original system, and a message indicating that the current system is not the complete system is output. It can be known that the current system of the mobile terminal is not the original system, i.e., the official system, but a modified non-official system.

According to the described matching procedure, a reference for determining the failure of the mobile terminal can be supported. When matching, it means that the cause of failure of the mobile terminal is not derived from the damaged system document. When matching fails, it means that the cause of failure of the mobile terminal is derived from the damaged document.

The original storage integrity information is pre-stored in the mobile terminal. In this embodiment, the original system is the official system pre-stored in the mobile terminal before the mobile terminal leaves the factory. Thus, the original storage integrity information is the information related to the storage integrity before the mobile terminal leaves the factory. In this embodiment, the information related to the storage integrity is pre-stored in the mobile terminal before the mobile terminal leaves the factory for providing original reference information for matching procedure after the mobile terminal goes out.

Step 103: When the matching fails, connecting to a server to obtain an original system partition document from the server, and repairs the system partition according to the original system partition document.

The server may be provided by the vendor, and the server is used for storing the original system partition document or upgraded system document.

Generally speaking, one mobile terminal corresponds one type of system document, for example, the Android system document is not compatible with the iOS system document, or the system document of iOS 8.0 system is different from the system document of iOS 9.0 system. Thus, it is desirable to acquire system document matching the mobile terminal and correct system version from the server, or acquire system document compatible with the system of the mobile terminal.

The mobile terminal acquires the original system partition document from the server via the mobile network, wireless network or wired network. When acquiring the system document, each the original system document stored in the server can be downloaded or only the damaged part of the system document of the mobile terminal is downloaded for saving the bandwidth.

The repairing of the system partition according to original system partition document can be implemented by replacing damaged system document of the mobile terminal or replacing all system documents, i.e., reinstalling the system.

Compared with the current technology, the embodiment is implemented by acquiring, by the mobile terminal, information related to the current storage integrity of the system partition, matching the information related to the current storage integrity with the original information related to the storage integrity, connecting to the server when the matching fails, obtaining an original system partition document from the server, and repairing the system partition according to the original system partition document. According to the described mechanism, when the mobile terminal determines the cause of failure of the mobile terminal is due to the damaged system document, the mobile terminal can connect to the server via network to acquire the original system document for repairing. This mechanism reduces the repair cost and complexity, and avoids the mobile terminal being sent back to the factory for repairing.

Figure 2:
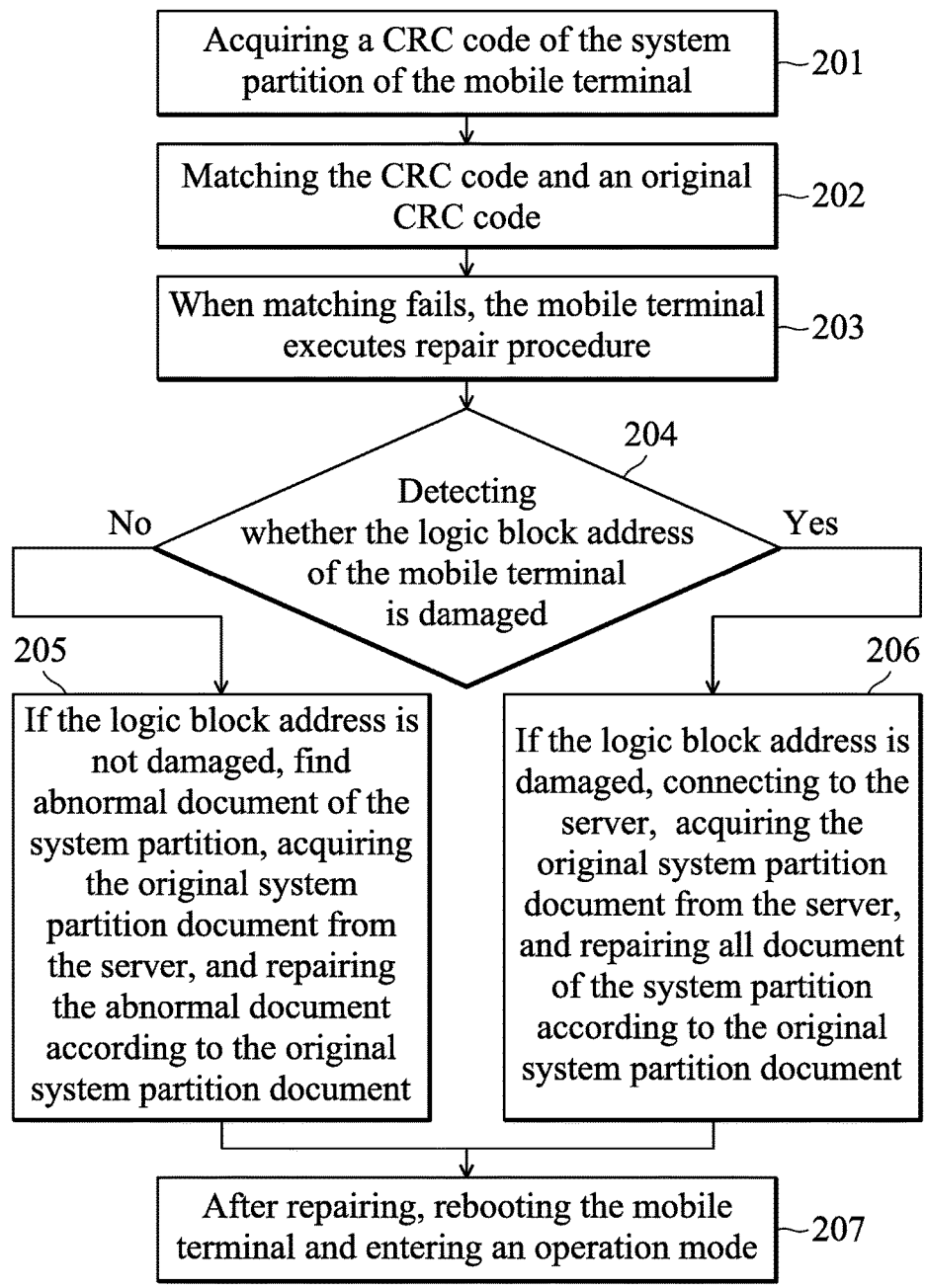
FIG. 2 is a flowchart of a repair method for a mobile terminal according to another embodiment of the invention.

Please refer to FIG. 2. FIG. 2 is a flowchart of a repair method for a mobile terminal according to another embodiment of the invention. The method comprises the following steps.

Step 201: acquiring a Cyclic Redundancy Check (CRC) code of the system partition of the mobile terminal.

The CRC is a debug method widely used in data communication. It is implemented by executing a specific algorithm to calculate CRC codes of documents to determine whether two documents are the same document by comparing the CRC codes of two documents.

In this embodiment, the way to obtain the CRC code of the system partition may be implemented by acquiring the content of the system document of the system partition of the mobile terminal and calculating the CRC code of the system document by CRC algorithm.

Step 202: matching the CRC code and an original CRC code.

The original CRC code is calculated according to the system document of the system partition of the mobile terminal before the mobile terminal goes out, or acquired from another mobile terminal of the same type. The original CRC code is then encrypted and stored in a predetermined storage area of the mobile terminal for comparing with the CRC code of step 202 when needed.

When the CRC code matches to the original CRC code, i.e., the CRC code of the system document acquired in step 201 is the same as the original CRC code, the system document is not damaged. If the CRC code does not match to the original CRC code, i.e., the CRC code of the system document acquired in step 201 is not the same as the original CRC code, the system document is damaged.

Obviously, the CRC, including CRC 16 and CRC 32, adopted in step 201 and 202 is only one example. In another embodiment, the check mechanism may be message-digest (MD) algorithm to calculate check value, for example MD4 and MD5.

Furthermore, steps 201 and 202 are performed automatically when the mobile terminal is rebooting or before entering the operation mode. In another embodiment, steps 201 and 202 are executed according to received instructions after entering the operation mode.

For example, when one CRC code calculated according to a current system document is not found in CRC codes of the pre-stored original system documents, or none of CRC codes of the original system documents is same as the CRC code calculated according to the current system document, it means the current system document is new added system document. Totally speaking, the current system has been modified, and is no longer the original system. The matching the current storage integrity information and original storage integrity information fails, it means the CRC matching fails.

In another embodiment, the matching is not limited to the CRC code of the current system document and the CRC code of the original system document. The matching may include the storage path and the name of the system document. For example, when a storage path and name of a system document A are not found in the storage paths and names of the original system documents, it can be determined that the current system document new adds the system document located in xxx\xxx\xxx, wherein A is the name of the system and includes a conjugated name, and "xxx\xxx\xxx" is the storage path of the system document A. In another embodiment, when a storage path and name of a system document B of the original system documents are not found in the storage paths and names of the current system documents, it can be determined that the current system document lost the system document B located in xxx\xxx\xxx. Thus, the mobile can determine whether the current system document is damaged.

Step 203: when matching fails, the mobile terminal executes repair procedure.

Step 204: checking whether the logic block address (LBA) of the mobile terminal is damaged.

The logic block address is the address pointing to a data block of the storage disk or magnetic tape. The address of the data block is used for searching or rewriting. If the address of the LBA is not damaged, we can find any document of the system documents by address searching. The checking method for LBA can use the root integrity check method in the repair mode of the mobile terminal.

Step 205: when the LBA is not damaged, searching abnormal document of the system partition, acquiring the original system partition document from the server, and repairing the abnormal document according to the original system partition document.

Step 206: If the LBA is damaged, connecting to the server, acquiring the original system partition document from the server, and repairing each document of the system partition according to the original system partition document. Since the LBA is damaged, the mobile terminal cannot find the corresponding system document by address searching, and all the system documents are needed to be repaired.

In the steps 205 and 206, the method to acquire the original system partition document from the server is implemented by following steps: turning on WiFi, connecting to the server, acquiring the original system partition documents from the server, and repairing all documents of the system partition according to the original system partition documents.

Specifically, in the repair mode, when the matching fails and it is needed to connect to the server, the WiFi connection can be automatically turned on. The way turning on WiFi connection in the repair mode is similar to the way turning on WiFi in the operation mode. If the WiFi station had been connected, the mobile terminal automatically connects to the WiFi station to connect the network. If the WiFi station had not been connected, the mobile terminal automatically searching available WiFi stations and connects to one of them.

Step 207: after repairing, rebooting the mobile terminal and entering an operation mode.

The described steps of the proposed method is not limited to repair the system partition, and can be applied to other partitions, such as 1k partition, recovery partition, boot partition and logo partition.

Compared with the current technology, the embodiment determines whether the current system document is complete by the CRC operation, and checks the logic block address in the repair mode. When the logic block address is not damaged, only the abnormal system document of the system partition is repaired by connecting to WiFi to acquire the original system document and repairing the abnormal system document according to the original system document. According to the described method, the embodiment can find the abnormal system document by address searching and repairs the abnormal system document. This reduces the time for repairing system document and further saving the cost of repair by connecting WiFi.

Although the embodiment is illustrated with the WiFi communication, but a person skilled in the art would understand the invention is not limited to the WiFi communication, and all the wireless or wired communication can be applied to the presented invention.

Figure 3:
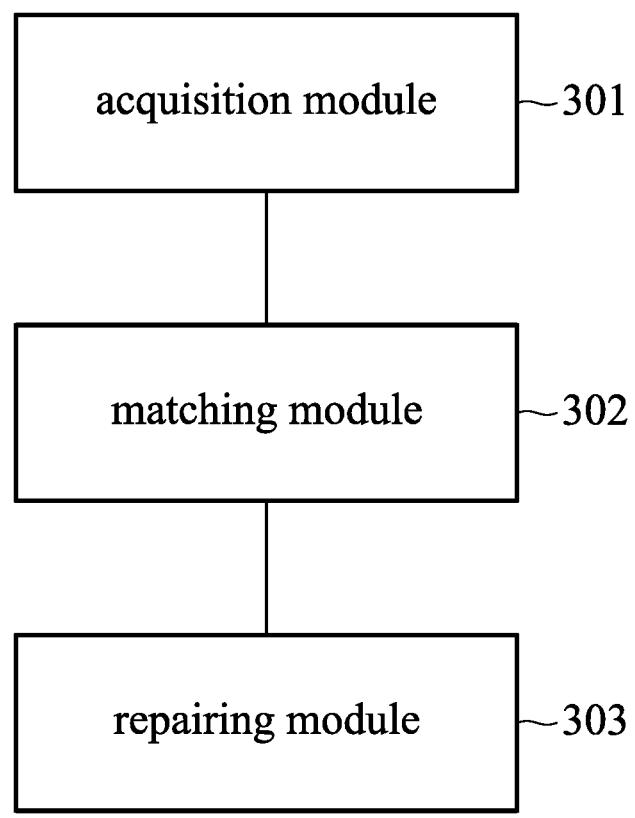
FIG. 3 is a schematic diagram of a mobile terminal with repair mechanism according to an embodiment of the invention.

Please refer to FIG. 3. FIG. 3 is a schematic diagram of a mobile terminal with repair mechanism according to an embodiment of the invention. The mobile terminal comprises an acquisition module 301, a matching module 302 and a repairing module 303.

The acquisition module 301 is configured to obtain current storage integrity information of the mobile terminal. The current storage integrity information indicates whether the documents stored in the mobile terminal are complete documents. When a current system of the mobile terminal is an original system, the current documents stored in the mobile terminal are complete documents. When the current system of the mobile terminal is not the original system, the current documents stored in the mobile terminal are not complete documents. The information related to the storage integrity may be the system document information of the system partition, or document information of other partition, or system version information, system creation time, such as a storage path, a name or content of a system document.

The matching module 302 is configured to match the current storage integrity information and original storage integrity information. The original storage integrity information is information related to storage integrity of the original system. The matching module 302 is configured to match the current storage integrity information and the original storage integrity information, and to determine that the documents stored in the mobile terminal are complete documents when the current storage integrity information is the same as the original storage integrity information. The system carried on the mobile terminal is the original system, the current system of the mobile terminal is a complete system, and a message indicating that the current system is the complete system is output. The matching module 302 is configured to determine the documents stored in the mobile terminal are incomplete documents when the current storage integrity information is different from the original storage integrity information. The system carried on the mobile terminal is not the original system, the current system of the mobile terminal is not a complete system, and a message indicating that the current system is not the complete system is output. It can be known that the current system of the mobile terminal is a modified non-official system.

A reference for determining the failure of the mobile terminal can be acquired after the matching module 302 performs the matching procedure. When matching, it means that the cause of failure of the mobile terminal is not derived from the damaged system document, otherwise it means that the cause of failure of the mobile terminal is derived from the damaged document.

The repairing module 303 is configured to connect to a server to obtain an original system partition document from the server, and to repair the system partition according to the original system partition document when the matching fails. The server may be provided by the vendor, and the server is used for storing the original system partition document or upgraded system document.

Generally speaking, one mobile terminal corresponds one type of system document, for example, the Android system document is not compatible with the iOS system document, or the system document of iOS 8.0 system is different from the system document of iOS 9.0 system. Thus, it is desirable to acquire system document matching the mobile terminal and correct system version from the server, or acquire system document compatible with the system of the mobile terminal.

The repairing module 303 acquires the original system partition document from the server via the mobile network, wireless network or wired network. When acquiring the system document, all the original system documents stored in the server can be downloaded or only the damaged part of the system document of the mobile terminal is downloaded for saving the bandwidth.

The repairing module 303 may repair the system partition by replacing damaged system document of the mobile terminal or replacing all system documents, i.e., reinstalling the system.

Figure 4:
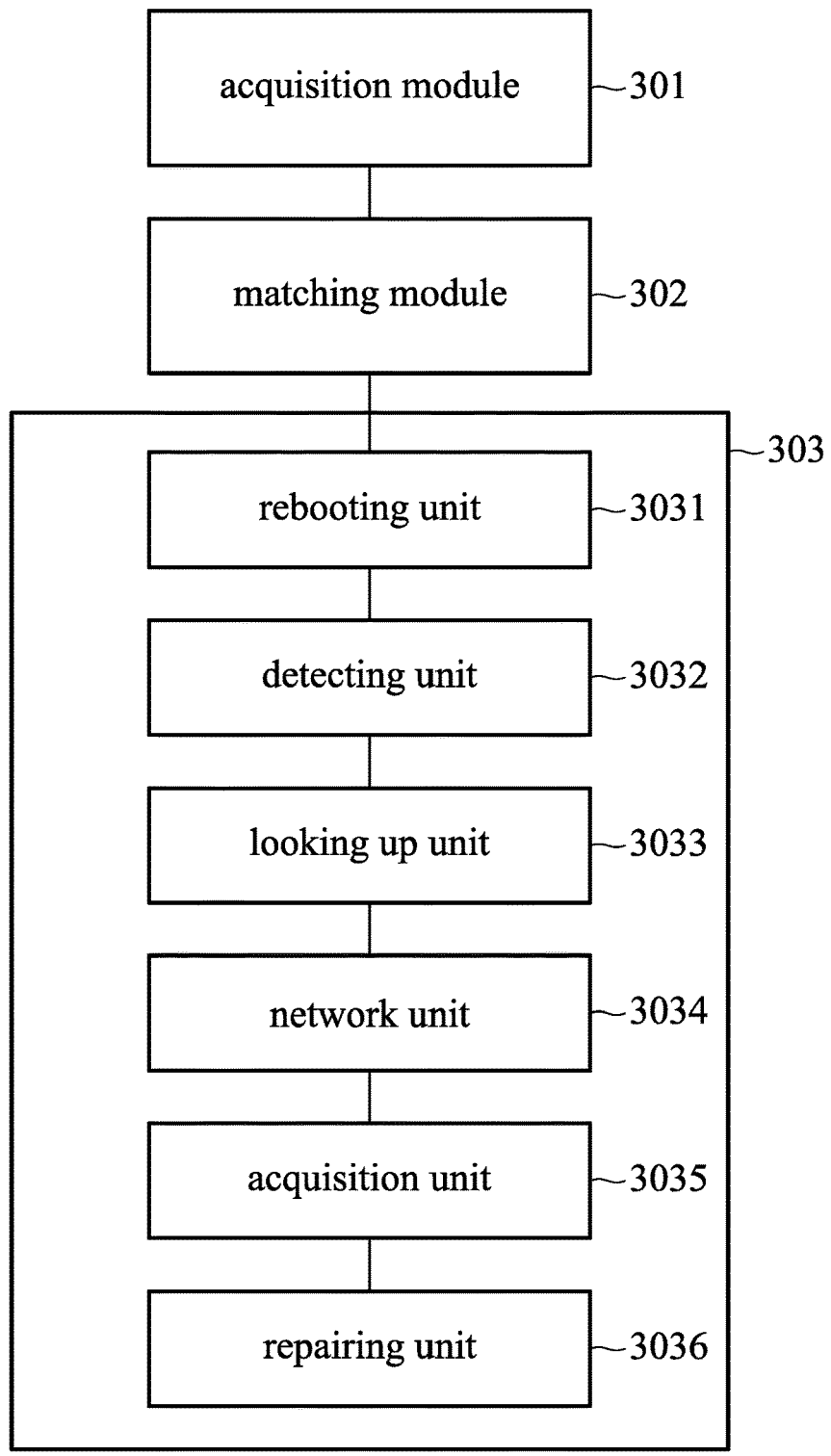
FIG. 4 is a schematic diagram of the repairing module 303 according to an embodiment of the invention.

Please refer to FIG. 4. FIG. 4 is a schematic diagram of the repairing module 303 according to an embodiment of the invention. The repairing module 303 comprises the following elements.

The rebooting unit 3031 is configured to reboot the mobile terminal and entering an operation mode after a repairing unit 3036 completes the repairing procedure.

The detecting unit 3032 is configured to detect whether the logic block address (LBA) of storage device of the mobile terminal is damaged when the matching fails. Specifically, the detecting unit 3032 detects after the rebooting unit 3031 reboots the mobile terminal and entering a repair mode.

The looking up unit 3033 is configured to find abnormal document of the system partition when the LBA is not damaged. The abnormal document is determined when the CRC code of the system partition of the mobile terminal acquired by the acquisition module 301 does not match to the original CRC code by the matching module 302.

The network unit 3034 is configured to connect to the server. The network unit 3034 may be WiFi unit connecting to the server by WiFi.

The acquisition unit 3035 is configured to acquire the original system partition document from the server, and to download the original system partition document from the server.

The repairing unit 3036 is configured to repair the abnormal document according to the original system partition document.

When the LBA is damaged, the network unit 3034 connects to the server, the acquisition unit 3035 acquires the original system partition documents from the server, and the repairing unit 3036 repairs all documents of the system partition according to the original system partition documents.

The described repair method is applied to the mobile terminal in this embodiment, and the operation is similar and not discussed here for briefly.

Compared with the current technology, the mobile terminal of the embodiment is configured to acquire information related to the current storage integrity of the system partition; to match the information related to the current storage integrity with the original information related to the storage integrity; to connect to the server when the matching fails, to obtain an original system partition document from the server, and to repair the system partition according to the original system partition documents when the matching fails. According to the described mechanism, when the mobile terminal determines the cause of failure of the mobile terminal is due to the damaged system document, the mobile terminal can connect to the server via network to acquire the original system document for repairing. This mechanism reduces the repair cost and complexity, and avoids the mobile terminal sending back to the factory for repairing.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A repair method for a mobile terminal, comprising:
    obtaining a current storage integrity information of a system partition of the mobile terminal;
    matching the current storage integrity information and an original storage integrity information; and
    connecting to a server, and obtaining an original system partition document from the server, and repairing the system partition according to the original system partition document when the matching fails,
    wherein the step of connecting to the server, and obtaining original system partition document from the server, and repairing the system partition according to the original system partition document when the matching fails further comprising:
    checking whether a logic block address of a storage device of the mobile terminal is damaged;
    if the logic block address is not damaged, finding abnormal document of the system partition, and repairing the abnormal document according to the original system partition document; and
    if the logic block address is damaged, connecting to the server, acquiring the original system partition document from the server, and repairing all document of the system partition according to the original system partition document.

2. The method as claimed in claim 1, wherein after repairing each document of the system partition according to the original system partition document, further comprising: rebooting the mobile terminal.

3. The method as claimed in claim 1, wherein the step of connecting to the server further comprises: connecting to the server via wireless network.

4. The method as claimed in claim 1, wherein the step of obtaining the current storage integrity information of the mobile terminal further comprises:
    acquiring a CRC code of the system partition of the mobile terminal; and
    the step of matching the current storage integrity information and the original storage integrity information further comprises:
    matching the CRC code and an original CRC code.

* * * * *